United States Patent [19]
Wolfert

[11] 3,810,338
[45] May 14, 1974

[54] METAL REINFORCED PLASTIC PANEL
[75] Inventor: Clarke K. Wolfert, Peoria, Ill.
[73] Assignee: H C Products Co., Princeville, Ill.
[22] Filed: Aug. 3, 1972
[21] Appl. No.: 277,774

[52] U.S. Cl............... 52/475, 52/473, 52/656
[51] Int. Cl.............................. E06b 7/08
[58] Field of Search ........... 52/314, 316, 455, 473, 52/475, 624, 629, 656

[56] References Cited
UNITED STATES PATENTS

| 3,287,854 | 11/1966 | Dasovic et al. | 52/314 X |
| 3,461,629 | 8/1969 | Smith | 52/314 |
| 3,638,383 | 2/1972 | Ribas | 52/473 X |
| 1,664,292 | 3/1928 | Gloekler | 52/629 X |
| 1,684,966 | 9/1928 | O'Conor | 52/629 X |
| 3,095,952 | 7/1963 | Ford | 52/473 |
| 3,455,079 | 7/1969 | Frederick | 52/656 X |

Primary Examiner—Price C. Faw, Jr.
Attorney, Agent, or Firm—Davis, McCaleb & Lucas

[57] ABSTRACT

A metal reinforced plastic panel structure adapted to use in bifold doors and the like and wherein the metal reinforcement elements are selected and related to other structural parts of the panel to provide an increase of panel weight which is more advantageous than detrimental, and which materially increases the strength, durability and rigidity of the panel while also avoiding problems, such as warping or damage to panel parts, which could result from temperature changes encountered during shipment or use and the different temperature coefficients of expansion of the associated metal and plastic parts.

8 Claims, 5 Drawing Figures

PATENTED MAY 14 1974   3,810,338
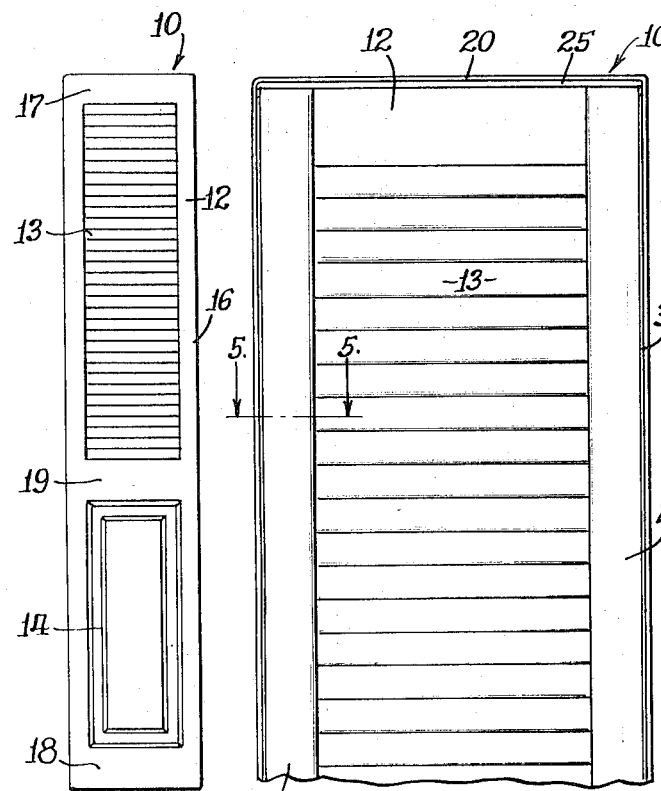
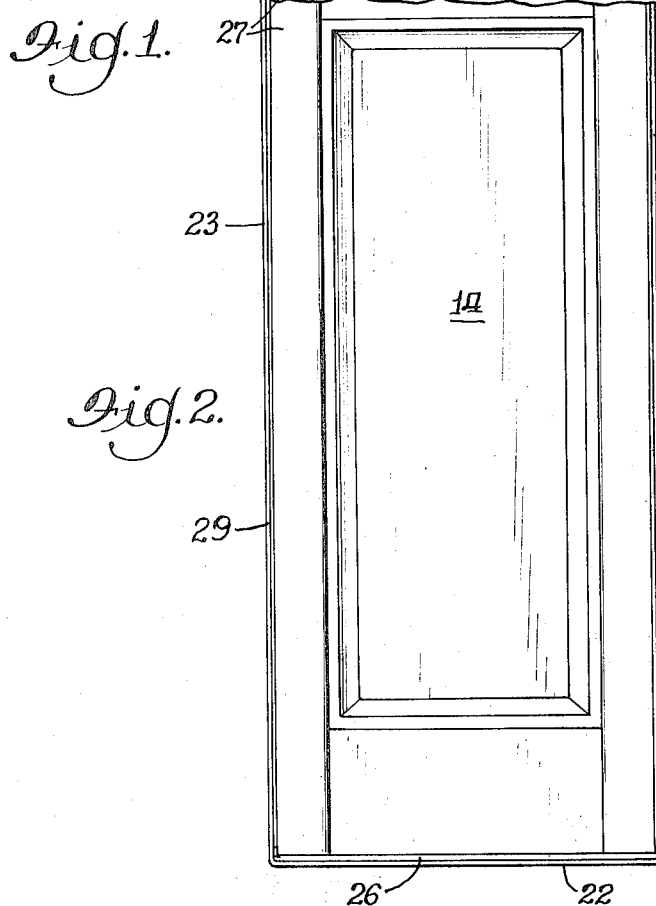
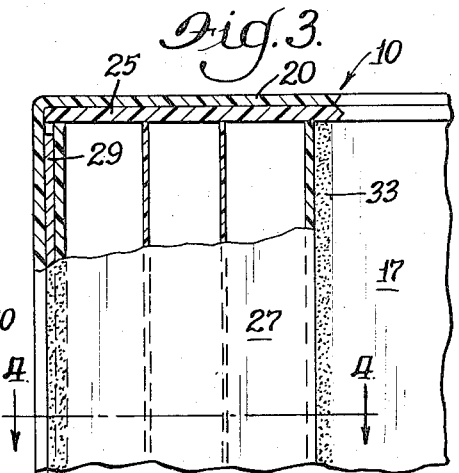
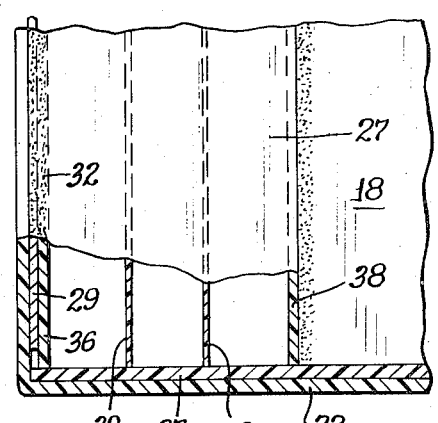
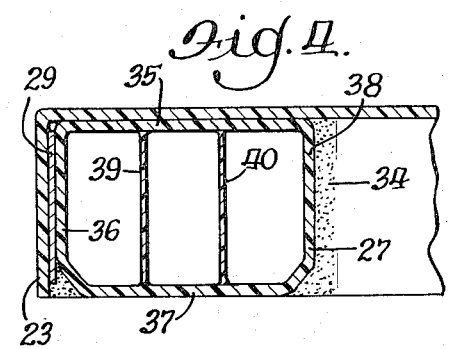
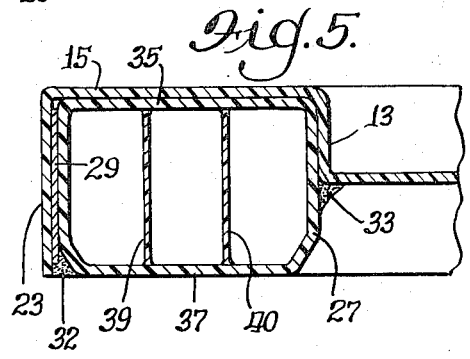

METAL REINFORCED PLASTIC PANEL

BACKGROUND OF INVENTION

There is some general and structural resemblance between the plastic panels disclosed herein and plastic panels used for simulated or decorative shutters which are adapted to use on the exteriors of buildings. However, the shutters are mounted in fixed positions against relatively flat surfaces, and are not subjected to the actions and movements, as well as the stresses, strains and abuses which door panels are expected to withstand in service. Being secured in a fixed position on a supporting surface, the skin and reinforcement of a shutter panel may be quite light in weight for conservation of material and cost, and need only withstand some stresses during shipment and installation, including the possibility of being dropped from a substantial height during installation, and have the stiffness and rigidity for maintenance of shape and configuration through extremes of hot and cold weather, as well as stresses resulting from winds. By judicious selections of parts, shapes and materials, an attractive and durable shutter can be produced from plastic parts and suitable adhesive materials.

A good and durable door panel, on the other hand, not only needs reinforcement providing stiffness approaching rigidity against stresses in various planes and directions, but is also helped in durability, operation and its "feel" of substantialness by the addition thereto of some effectively distributed weight in addition to that of the normally required plastic material. Particularly is such weight addition advantageous when, as in the disclosed structure, it can be utilized to effectively provide a very material increase of structural rigidity where most needed and strength where it is desirable. The disclosed concept utilizes a relatively small amount of a relatively inexpensive metal having a high elastic modulus and in a manner such that it is effectively confined in operative coaction with other structural parts without restriction which would be likely to produce detrimental effects as a result of temperature changes and the differences of the temperature coefficients of expansion of the metal and plastic materials.

OBJECTS OF THE INVENTION

This invention relates to metal reinforced plastic panels, and particularly to such panels which are adapted to use as doors, as, for example, in doors of the bifold type.

One of the general objects of this invention is to provide a metal reinforced plastic panel suitable to use as, or as a segment of, a door and in which the metal reinforcement adds some weight to the structure and materially contributes to the rigidity and strength of the panel, without adding sources of problems or detrimental effects, as might arise from factors such as the differences of the temperature coefficients of expansion of the metal and plastic parts.

As another object, the invention has within its purview the effective use of an inexpensive strip type of reinforcing element which can be readily, quickly and easily installed in the assembly and which coacts with other parts to both receive and impart desirable reinforcement as a result of limited confinement.

This invention has within its purview the provision of a structure for metal reinforced plastic panels in which effective reinforcement is imparted primarily by strip type metal elements extending longitudinally of opposite side marginal regions of the panel; said strips being easily insertable into laterally confined spaces and confined to the assembled relationship in a manner to provide for movement between adjacent metal and plastic parts, as well as limiting the length of the metal elements to avoid problems resulting from uneven expansion and contraction of the metal and plastic parts caused by temperature changes.

It is an object of this invention to provide a metal reinforced plastic panel wherein relatively thin strip type metal reinforcing elements are disposed in positions such that the maximum strength section modulus of each opposes flexure of the panel in a direction normal to the general plane of the panel, and wherein the metal elements are confined against flexure in directions lateral to their relatively thin dimension by other structural elements of the panel in order to provide additional strength and rigidity to the structure.

In the reinforced metal panels of this invention, the metal reinforcing elements which are used not only strengthen and rigidify the panels, but also serve as mounting plates for the firm and lasting securement of hardware to the panels.

Further within the purview of this invention is the use of a material, such as a hot melt plastic which does not tend to weaken the plastic parts of the structure to which it is applied, and which has sufficient flexibility to allow expansion and contraction of the panel components without deformation of the panel.

These and other objects and advantages of the invention will become apparent from the following detailed description of the structure and part relationships of the disclosed embodiment.

DESCRIPTION OF THE INVENTION

In the accompanying drawings, wherein like reference numerals refer to corresponding parts throughout the several views:

FIG. 1 is a front elevational view of a reinforced plastic panel embodying a preferred form of this invention;

FIG. 2 is a rear elevational view of the reinforced plastic panel shown in FIG. 1 and is drawn to a larger scale than FIG. 1, with the mid-region of the panel broken away to limit the length of the view;

FIG. 3 is a fragmentary view similar to portions of FIG. 2, but drawn to a larger scale than FIG. 2 and having parts thereof broken away to show structural details;

FIG. 4 is a fragmentary end sectional view taken substantially at the position and in the direction indicated by a line 4—4 and accompanying arrows in FIG. 3; and FIG. 5 is a fragmentary sectional view similar to FIG. 4, but taken substantially at the position and in the direction indicated by a line 5—5 and accompanying arrows in FIG. 2.

Having reference to the accompanying drawings, a reinforced plastic panel 10 has a generally planar face skin 12 which, as generally used, is made of a heat and pressure molded plastic, such as high impact styrene sheet, and which is usually embossed to provide decorative panel areas 13 and 14. In the panel disclosed, the panel area 13 is molded to simulate a series of adjacent louvers, while the panel area 14 has the configuration of a recessed and framed plain panel area. Co-planar stile portions 15 and 16 of the surface skin extend along opposite sides of the panel, exteriorly of the decorative panel areas 13 and 14. Also, panel portions 17 and 18 are provided at the top and bottom margins of the door respectively, while an intermediate panel portion 19 extends between the decorative panel portions 13 and 14, all of which are in co-planar relationship to the stiles 15 and 16 to effectively frame the decorative panel portions in the panel structure.

The face skin 12 has end flanges 20 and 22 and side flanges 23 and 24 of preselected width integrally molded thereon, which flanges extend rearwardly of the face skin in substantially right angular relationship thereto. To promote rigidity and solidity of the structure, adjacent ends of the end and side flanges are desirably integrally adjoined. In usual production, the flanges are integrally formed on the face skin at the same time that the decorative panel portions are molded during the application of heat and pressure to the plastic material.

For end reinforcement, plastic strips 25 and 26 of a width conforming to that of the interior of the end flanges 20 and 22 are secured by a suitable adhesive to the interior surfaces of the end flanges 20 and 22 and extend between the side flanges 23 and 24. The edges of the reinforcing strips 25 and 26, when secured in position, are substantially flush with the rear edges of the end flanges 20 and 22.

Because panels of the type herein depicted are generally much longer or higher than their width, the need for side reinforcement considerably exceeds, and also differs from, the need for reinforcement at the ends. To provide a portion of the required side reinforcement, and to serve a double function, as will be hereinafter explained in greater detail, side rails 27 and 28 are secured to the backs of the stile portions of the panel and extend practically the full length of the panel and into engagement with the end reinforcing strips 25 and 26. It is to be observed particularly that the side rails 27 and 28 are spaced somewhat from the adjacent side flanges 23 and 24 of the panel; the spacing between each of the side rails and its adjacent panel flange being just sufficient for the insertion of reinforcing metal strips 29 and 30 between the side rails and adjacent flanges. Although the metal strips 29 and 30 are relatively thin, they each have an elastic modulus which is very much greater than that of the plastic material, particularly when confined against lateral flexure relative to the thinner section thereof.

In the disclosed structure, as shown in FIGS. 4 and 5, the width of the metal strips 29 and 30 is somewhat less than the internal width of the side flanges 23 and 24 of the panel, while side rails 27 and 28 have a thickness such that when in assembled positions, as indicated in FIGS. 4 and 5, the rear surfaces of the side rails are substantially flush with the rear edges of the adjacent flanges. Then, for effective securement of the metal strips 29 and 30 in their operative positions between side rails and panel flanges, a continuous seam of hot melt plastic 32 bridges the space between each side rail and its adjacent panel flange and extends across the edge of the metal reinforcing strip. Additionally to secure the side rails 27 and 28 in position, and to further rigidify the structure, a continuous seam 33 of hot melt plastic extends along the full length of each side rail on the side of each rail opposite the metal reinforcing strip to secure the side rails directly to the rear surface of the face skin. At the ends, seams 34 of hot melt plastic also secure the sides of the side rails to the end reinforcing strips 25 and 26. As previously suggested, the side rails 27 and 28 not only add materially to the rigidity and strength of the panel structure, but are also utilized in this structure to effectively contribute to the reinforcement afforded by the relatively thin metal strips by preventing those strips from having any material flexure in the direction of their thin sections. Thus, the side rails are made and secured in place to provide stability and rigidity in transverse directions. For that purpose, and as herein disclosed, the side rails are extruded sections of plastic material, such as high impact styrene. In addition to having an outer box section encompassed by outer walls 35, 36, 37 and 38, the side rails include integral webs 39 and 40 which extend between the outer walls 35 and 37 in spaced relationship to one another and also in spaced relationship to the outer walls 36 and 38.

Steel has been found to be a very satisfactory and suitable metal for the metal reinforcing strips, not only because of its very high elastic modulus, but because the addition of some weight to each of the metal panels gives the panels a better functional weight in uses such as in bifold doors. Since the steel extends along the side edges of the panels, its strength at that position is also advantageous in connection with the securement of hardware, such as hinges to the panels. However, since the plastic materials, such as high impact styrene, have temperature coefficients of expansion which are much larger than that of the metal or steel reinforcing strips, precautions must be taken in the structure and arrangement of parts of the panel to avoid warping or damage to the panels which might result from variations of temperature encountered both in shipping and in use. For this reason, the metal strips 29 and 30 are designedly made shorter than interior lengths of the adjacent panel flanges. For example, in a conventional closet door panel, the metal strips should be about one-half inch shorter than the interior length of the adjacent panel flange. Additionally, as will be observed in respect to the disclosed structure, the securement of the metal strips is by a seam of hot melt plastic which bridges the edge of the metal strip. Otherwise, the engaging metal and plastic surfaces are only in frictional contact, so that even though closely confined against flexure, the plastic and metal parts can slide relative to one another without adverse deformation or breakage of the panel parts.

From the foregoing description, and by reference to the accompanying drawings, it may be readily appreciated that the simplicity of the metal strips and their manner of installation in the assembly do not add materially to the cost of the panel structure, but add very considerably and materially to its strength and rigidity, as well as affording a rugged anchor for some types of hardware, so that installation of the panels in bifold doors and the like will afford a durable structure. The added weight of the metal strips has an operational advantage, and the cost thereof is offset by permitting the use of lower and cheaper grades of plastic material in the panels which are materially cheaper, without weakening the panels or reducing their service lives. It has even been found that the added strength afforded by the metal reinforcement reduces shipping costs and the costs of packaging required for safe shipment. With

I claim:

1. A reinforced plastic panel adapted for use in bifold doors and the like, and comprising, in combination, a rectangular and generally planar face skin of molded plastic material having integral and adjoined marginal flanges of a preselected width projecting in substantially right angular relationship to the general plane of the face skin at the sides and ends thereof, end reinforcing strips secured internally of said end flanges and extending between the side flanges, said end reinforcing strips conforming substantially in width to the internal widths of the end flanges and having surfaces in generally flush relationship thereto, side stiffening rails of plastic material adhered internally of the side flanges in spaced relationship thereto and extending between opposed end regions of the end reinforcing strips, said side stiffening rails having sectional size and structure affording material stiffness characteristics in directions both laterally of and parallel to the general plane of the face skin elongated metal reinforcing strips fitting snugly in the spaces between the side flanges and the side stiffening rails, said metal reinforcing strips being somewhat narrower than the internal widths of the side flanges and extending along major portions of the lengths thereof, and means for retaining said metal reinforcing strips in place between the side flanges and side stiffening rails in a manner permitting free relative movement therebetween.

2. A reinforced plastic panel as defined in claim 1, wherein said side stiffening rails are of generally rectangular and hollow section with internal integral webs extending between opposed internal surfaces thereof, and wherein said means for retaining the metal reinforcing strips in place comprises seams of adhesive material adjoining adjacent portions of the side flanges and side stiffening rails across edges of said metal reinforcing strips without preventing free movement of the latter relative to said flanges and rails.

3. A reinforced plastic panel as defined in claim 1, and wherein the difference in the lengths of said side stiffening rails and said metal reinforcing strips is ample to avoid warping or damage to the panel as a result of a wide range of temperature changes productive of relative movement therebetween.

4. A reinforced plastic panel adapted for use in bifold doors and the like and comprising, in combination, a generally planar face skin of hard plastic material having thereof integral marginal flanges of preselected width which project in substantially right angular relationship to the general plane of the face skin along opposed longitudinal edges thereof, elongated metal reinforcing strips of relatively thin lateral section mounted against and extending along major portions of the inner surfaces of said flanges, said metal reinforcing strips being somewhat narrower than said flanges with edges disposed against inner surfaces of the face skin adjacent the flanges, plastic frame means of relatively rigid section in a direction parallel to the general plane of the face skin and of a thickness corresponding to the width of the flanges, secured to the face skin adjacent said metal reinforcing strips to confine and rigidify the metal reinforcing strips in directions transverse to their thin lateral section, and means connecting said plastic frame means to the respective flanges in a manner to retain the metal reinforcing strips between the plastic frame means and flanges while permitting normal expansion and contraction movements of the metal reinforcing strips relative to the surface skin and plastic frame means in response to temperature variations.

5. A reinforced plastic panel as defined in claim 4, and wherein said means connecting said plastic frame means to the respective flanges extends across the edges of the metal reinforcing strips opposite the face skin.

6. A reinforced plastic panel as defined in claim 4, and wherein said means connecting said plastic frame means to the respective flanges comprises seams of hot melt plastic material extending across the edges of the metal reinforcing strips opposite the face skin and adhered to both the flanges and the plastic frame means.

7. A reinforced plastic panel adapted for use in bifold doors and the like, and comprising, in combination, a molded plastic face skin having integral marginal side and end flanges of preselected width projecting angularly therefrom, reinforcing means of plastic material secured internally of the end flanges, second reinforcing means of plastic material secured to the face skin internally of and in spaced relationship to said side flanges, metal strips mounted in the spaces between the side flanges and second reinforcing means in a manner permitting free thermal expansion and contraction movements thereof within said space, said metal strips having sectional proportions providing high resistance to bending in directions normal to the face skin and being engaged with said side flanges and second reinforcing means to provide resistance to flexure in directions parallel to the face skin.

8. A reinforced plastic panel as defined in claim 7, and wherein said metal strips are shorter than the inner surfaces of the side flanges, and are held in place by means permitting relative movements between the metal strips and the side flanges and second reinforcing means to prevent disruption of the panel structure by temperature changes and differences in coefficients of expansion of the metal and plastic materials.

* * * * *